Nov. 17, 1959 — A. J. FISHER — 2,913,030
MOISTURE-FREE BAG
Filed Oct. 22, 1956
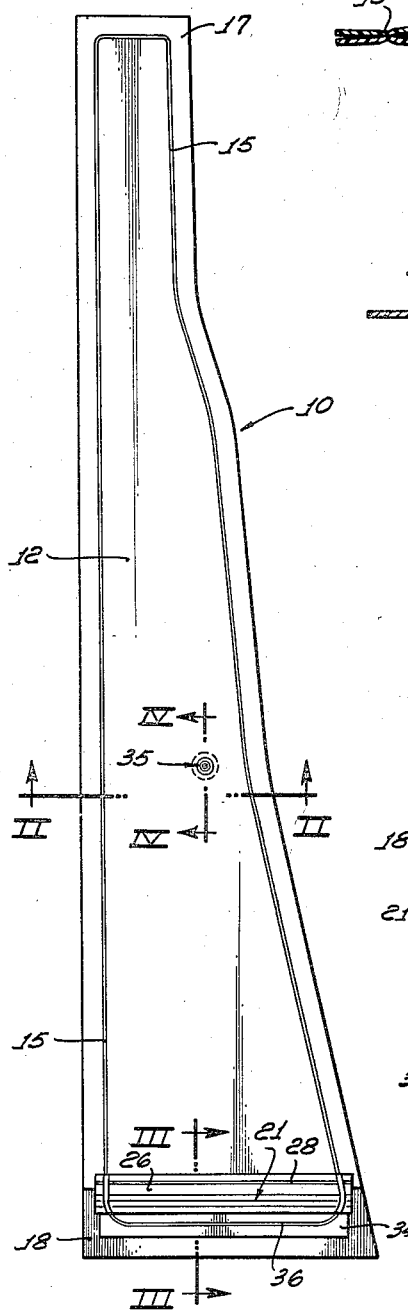
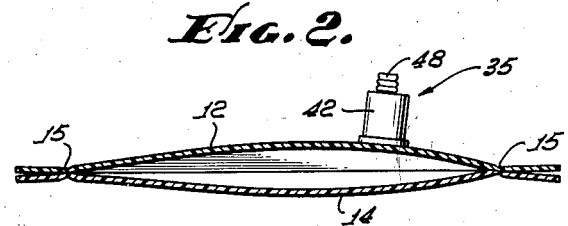
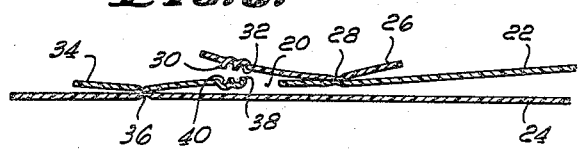
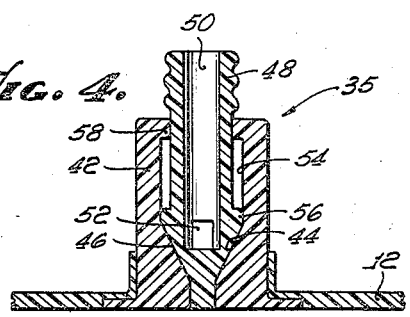
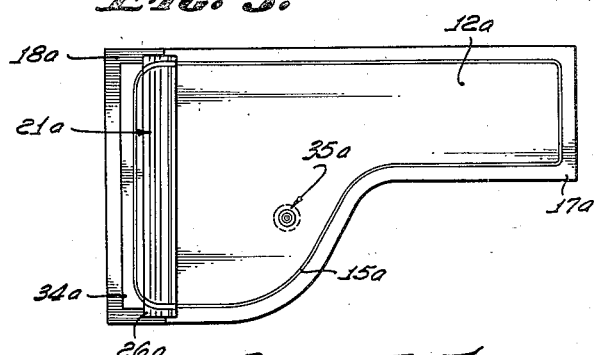
ARNOLD J. FISHER
INVENTOR.
BY
ATTORNEY.

United States Patent Office 2,913,030
Patented Nov. 17, 1959

2,913,030

MOISTURE-FREE BAG

Arnold J. Fisher, Buena Park, Calif.

Application October 22, 1956, Serial No. 617,357

2 Claims. (Cl. 150—52)

This invention relates to a bag or container and particularly to a bag or container adapted to the dust-proof moisture-free storage of fire arms, fishing tackle and other such corrodible objects.

Generally stated the invention pertains to a tube-like container or bag of relatively thin tough pliable sheet material that is capable of being readily sealed in a leak-proof, gas-tight manner about a fire arm or other object to be stored or protected, such container being provided with valve means by which substantially all air and entrained moisture may be evacuated from the atmosphere surrounding the object. Preferably all portions of the container are composed of a resilient pliant plastic material such as a resinous thermoplastic or thermosetting composition, compounded rubber (natural or synthetic), or other suitable material. Desirably no metallic fastenings or other separate attachments are employed.

Heretofore numerous devices and procedures have been employed in an effort to protect such objects as guns, fishing rods, tackle and the like from the corrosive effects of moisture or humidity generally present in air surrounding the object. It is common knowledge that such efforts have not been entirely successful, particularly where the gun, tackle, rod, etc. is used or stored in a very wet or humid climate or is carried across dew covered fields, streams, or in open areas subject to rain. Under these conditions rust deposits frequently form on exposed portions of such items despite the most diligent use of protective measures and devices; for example, films of oil, canvas bags, etc. Accordingly the development of some satisfactory means providing adequate dust-proof, moisture-free protection of such objects during their transportation or storage has long been highly desired.

It is a specific object of the present invention therefore to provide a tough re-usable easily sealed container or bag which can be used to satisfactorily protect such easily corroded objects as guns, fishing tackle and the like, the container being provided with means for evacuating the air from the container to provide a substantially moisture-free, non-corrosive atmosphere about such object.

A further object of the invention is to provide such a bag or container that is particularly adapted to the use of tough impervious pliable heat-sealable material in its construction.

Another object of the invention resides in the novel method of forming the bag or container whereby the cost of its production is reduced to a minimum.

Other objects and advantages of the present invention will be apparent from the following description of exemplary embodiments of the invention and from the drawings in which:

Fig. 1 is a top plan view of a container embodying the invention;

Fig. 2 is a view in section along the line II—II of Fig. 1;

Fig. 3 is a like view along the line III—III of Fig. 1;

Fig. 4 is a greatly enlarged detail view along the line IV—IV of Fig. 1; and

Fig. 5 is a top plan view of a modified form of the container, in accordance with the invention.

Each of the containers illustrated in the drawings is of a tubular, liquid-proof, gas-tight construction that permits the container to enclose an object to be protected, while excluding dust, moisture, humidity, etc. In a preferred embodiment illustrated in Figs. 1 to 4 the container 10 is of an elongated construction that particularly adapts the container to the reception and protection of rifles and similarly shaped objects. Preferably the container 10 is constructed from a pair of pliable superimposed sheets 12 and 14 of impervious material heat-sealed about their edges, as at 15, to form a bag having a small closed end 17 and a large open end 18. A preferred material for use in so forming the bag 10 is a polyethylene resin in sheet form having a Shore hardness between about 60 to 70 and milled to a thickness on the order of 0.001 to 0.015 inch, such material having been found to provide a desired combination of toughness, flexibility, wearability and moisture and gas resistance. Desirably, the upper sheet 12 is of somewhat lesser length adjacent the end 18 of the bag than the lower sheet 14 so that heat-sealing seam 15 leaves an opening 20 between the sheets (Figs. 1 and 3).

In accordance with the invention a flexible interlock means 21 of material similar to that forming the bag is heat-sealed to extending end portions 22 and 24 respectively of the sheets 12 and 14, adjacent the opening 20. In the illustrated embodiment the interlock means comprises a first transverse strip 26 heat-sealed, as at 28, to the end 22 of the top sheet. As shown this strip is provided with a plurality of tongues 30 and grooves 32 extending longitudinally of the strip. A second strip 34 heat-sealed to the bottom sheet, as at 36, is similarly provided with a plurality of corresponding tongues 38 and grooves 40 extending in longitudinal parallel relation below the tongues and grooves of the uppermost strip 26. As will be apparent to one skilled in the art the opposed tongues and grooves of the strips 26 and 34 are frictionally engageable to provide a substantially leak-proof, gas-tight closure of the opening 20. Desirably, to effect a more convenient closure, the strip 26 is first heat-sealed to the end 22 of the sheet 12 and thereafter the edge seal 15 is impressed through the superimposed layers comprising the sheet 12 and strip 26 and the sheet 14 and strip 34. In this preferred construction the edge seal 15 also serves as the seal 36 holding the strip 34 to the lowermost sheet 14 (Fig. 1).

It is a feature of the invention that valve means 35 are provided in one of the superimposed sheets 12 or 14 to facilitate the evacuation of air and entrained moisture or humidity from the container 10. In the construction illustrated in Fig. 4, the valve 35 comprises a cylindrical element 42 heat-sealed into an opening provided in a side wall of the bag, such element forming an outlet leading from the interior of the bag to the surrounding atmosphere. Preferably the cylindrical element is provided with a tapered seat 44 adapted to engage in sealing relation a correspondingly tapered surface 46 provided on a ported valve element 48. As shown, the valve element 48 is provided with an axial passage 50 leading to a pair of ports 52 opening adjacent the tapered surface 46, all portions of the element 48 being of somewhat smaller diameter than the inner cylindrical surface 54 of the cylinder 42. As a result, sliding movements of the valve element 48 upwardly within the cylinder 42 will break the seal at 46, providing an exhaust passage from within the bag to the surrounding atmosphere. Flanges 56 and 58 provided on the valve element and cylinder serves to keep the valve element in place within the cylinder. It will be understood however, that both the valve element 48 and cylinder 42 may be constructed of a resilient elastic material of composition generally similar to the container, thereby facilitating initial insertion of the valve element into the cylinder.

The operation of the above described container in protectively enclosing a gun or similar object will now be described:

The interlock means 21 is first disengaged, by pulling upwardly on the extending end of the interlock strip 26, and the gun inserted well up into the bar 10 so that it is enveloped on all sides by the tough pliable material of the bag sides 12 and 14. Next, the tongues and grooves of the interlock means 21 are frictionally engaged to tightly seal the opening 20. The valve element 48 is pulled upwardly to provide a passage for air between the tapered surfaces 44 and 46, through the ports 52 and upwardly through the passage 50. The user of the bag 10 may now effectively evacuate air from within the bag by sucking on the extending valve element 48. It has been determined for example that a vacuum on the order of 4 to 6 inches of mercury can readily be obtained in this manner. As a result the atmosphere remaining within the bag and surrounding the object to be protected is rendered substantially moisture free, as in conventional vacuum packing applications. The valve element 48 is now thrust inwardly so that its tapered surface 44 is in sealing contact with the surface 46 of the cylinder 42, thereby effectively sealing the interior of the bag from the surrounding atmosphere.

Fig. 5 illustrates a modified form of the invention which, although similar to the container 10 just described, is particularly adapted to use with a pistol or other similarly shaped object, such as a fishing reel. In other respects, however, the container of Fig. 5 is identical to that described and illustrated in Figs. 1 to 4, corresponding reference numerals indicating corresponding parts.

From the above description of exemplary devices it should be apparent that the containers of the present invention possess many highly desired but heretofore unobtainable features. Specifically, the unique construction of each container provides a rugged lightweight protecting envelope that may be readily sealed and evacuated to provide a substantially moisture-free atmosphere for objects contained therein. Moreover, the containers of the invention may be readily formed from superimposed sheets of relatively thin inexpensive pliable heat-sealable material, quickly, and with a minmium requirement of production facilities. A further advantage of the containers of the invention is that all parts thereof may be composed entirely of resinous heat and moisture resistant materials, and without reliance on corrodible hard to assemble metallic parts, fasteners, etc.

To those skilled in the art to which this invention relates, many changes in construction and widely differing embodiments and applications of the invention will suggest themselves without departing from the spirit and scope of the invention. For example, although the containers of the invention have been particularly described in relation to the storage or protection of guns, fishing tackle and the like, the containers could be as easily adapted to use as garment bags, or for the protection and storage of tools or machines, without material variation from the principles of the invention. Moreover, many other forms of valves or closure devices might be employed in addition to those specifically described. Accordingly it should be understood that the disclosures and the description herein are purely illustrative and are not intended to be in any sense limiting.

I claim:

1. A container particularly adapted to the moisture-proof storage of firearms and similar objects comprising an elongated tube of relatively thin, tough, pliable material and having a narrow end and a wide end, said tube being closed at said narrow end and having an approximately pillow-shaped configuration in cross section when expanded, the open wide end of said tube being provided with frictionally engageable interlock means adapted to seal said open end in a leak-proof, gas-tight manner, and valve means extending through said sheet material comprising a cylindrical element forming an outlet and having a tapered seat, and ported means slidably mounted in said cylindrical element and having a correspondingly tapered surface adapted to engage said seat in leak-proof, gas-tight sealing relation, whereby moisture containing gases may be evacuated from said tube subsequent to sealing an object therein.

2. A bag particularly adapted to the moisture-free storage of fire arms and similar objects comprising: a pair of super-imposed sheets of impervious, pliable material, said sheets being heat-sealed to one another adjacent their edges to form a bag having an opening at one end, flexible interlocking means of similar material heat-sealed to edge portions of said super-imposed sheets adjacent said opening, said interlocking means comprising strips of impervious, pliable material each having a plurality of longitudinally extending tongues and grooves, said tongues and grooves being frictionally engageable to provide said closure, and valve means provided in one of said sheets to facilitate evacuation of air and moisture from said bag, said valve means comprising a cylindrical element forming an outlet and having a tapered seat, and ported means slidably mounted in said cylindrical element and having a correspondingly tapered surface for engaging said seat in leak-proof, gas-tight sealing relation.

References Cited in the file of this patent

UNITED STATES PATENTS

| | | |
|---|---|---|
| 1,211,369 | Miller | Jan. 2, 1917 |
| 2,323,629 | Spanel | July 6, 1943 |
| 2,392,108 | Vidal et al. | Jan. 1, 1946 |
| 2,551,315 | Christopher et al. | May 1, 1951 |
| 2,575,118 | Pattison | Nov. 13, 1951 |
| 2,627,887 | Becker | Feb. 10, 1953 |
| 2,686,652 | Carlson et al. | Aug. 17, 1954 |
| 2,693,836 | Hayes | Nov. 9, 1954 |
| 2,780,261 | Svec et al. | Feb. 5, 1957 |